ized Patent
Haberman et al.

(10) Patent No.: US 6,240,292 B1
(45) Date of Patent: *May 29, 2001

(54) METHOD AND SYSTEM FOR PROVIDING A HANDOFF FROM A CDMA CELLULAR TELEPHONE SYSTEM

(75) Inventors: Michael Haberman, Morris Plains; Glenn Pierson, East Hanover, both of NJ (US)

(73) Assignee: Cellco Partnership, Bedminster, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/447,433

(22) Filed: Nov. 23, 1999

Related U.S. Application Data (63) Continuation of application No. 08/366,352, filed on Dec. 29, 1994.

(51) Int. Cl.[7] ............................................. H04Q 7/20
(52) U.S. Cl. ..................... 455/439; 455/432; 455/436; 370/331
(58) Field of Search ..................................... 455/422, 432, 455/434, 435, 436, 437, 438, 439, 442, 517, 524, 525; 370/331, 332, 335, 465; 375/216

(56) References Cited

U.S. PATENT DOCUMENTS

| | | |
|---|---|---|
| 4,754,453 | 6/1988 | Eizenhoffer . |
| 4,765,753 | 8/1988 | Schmidt . |
| 4,901,307 | 2/1990 | Gilhousen et al. . |
| 4,984,247 | 1/1991 | Kaufmann et al. . |
| 5,042,082 | 8/1991 | Dahlin . |
| 5,101,501 | 3/1992 | Gilhousen et al. . |
| 5,109,390 | 4/1992 | Gilhousen et al. . |
| 5,117,502 | 5/1992 | Onoda et al. . |
| 5,127,100 | 6/1992 | D'Amico et al. . |
| 5,164,958 | 11/1992 | Omura . |
| 5,179,571 | 1/1993 | Schilling . |
| 5,184,347 | 2/1993 | Farwell et al. . |
| 5,195,090 | 3/1993 | Bolliger et al. . |
| 5,200,957 | 4/1993 | Dahlin . |
| 5,210,771 | 5/1993 | Schaeffer et al. . |
| 5,224,120 | 6/1993 | Schilling . |
| 5,228,053 | 7/1993 | Miller et al. . |
| 5,235,615 | 8/1993 | Omura . |
| 5,241,685 | 8/1993 | Bodin et al. . |
| 5,243,598 | 9/1993 | Lee . |
| 5,257,401 | 10/1993 | Dahlin et al. . |
| 5,267,261 | 11/1993 | Blakeney, II et al. . |
| 5,267,262 | 11/1993 | Wheatley, III . |
| 5,276,906 | 1/1994 | Felix . |
| 5,278,892 | 1/1994 | Bolliger et al. . |
| 5,278,991 | 1/1994 | Ramsdale et al. . |
| 5,285,469 | 2/1994 | Vanderpool . |

(List continued on next page.)

*Primary Examiner*—Nay Maung
(74) *Attorney, Agent, or Firm*—McDermott, Will & Emery (57) ABSTRACT

A mobile assisted handoff of a mobile station transitioning from a CDMA portion of a cellular telecommunication network to an analog portion of the network is provided as a function of a CDMA pilot signal transmitter located at each analog cell in the analog portion of the network. The mobile station monitors a CDMA pilot signal transmitted from each CDMA cell and each analog cell of the cellular telecommunication network, measures the signal strength of each received CDMA pilot signal and transmits the signal strength to the MTSO. The MTSO determines whether the pilot signal is associated with a CDMA base station or an analog base station. When the mobile station receives a pilot signal from an analog cell whose signal strength is above a first predetermined threshold and the received signal strengths of all pilot signals of the CDMA base stations with which the mobile station is currently in communication are below a second predetermined threshold, the MTSO directs a CDMA to analog handoff message to the mobile station.

27 Claims, 3 Drawing Sheets

U.S. PATENT DOCUMENTS

| | | |
|---|---|---|
| 5,289,499 | 2/1994 | Weerackody . |
| 5,295,153 | 3/1994 | Gudmundson . |
| 5,301,356 | 4/1994 | Bodin et al. . |
| 5,305,308 | 4/1994 | English et al. . |
| 5,309,503 | 5/1994 | Bruckert et al. . |
| 5,313,489 | 5/1994 | Menich et al. . |
| 5,317,623 | 5/1994 | Sakamoto et al. . |
| 5,323,446 | 6/1994 | Kojima et al. . |
| 5,327,574 | 7/1994 | Monma et al. . |
| 5,327,577 | 7/1994 | Uddenfeldt . |
| 5,345,467 | 9/1994 | Lomp et al. . |
| 5,416,797 | 5/1995 | Gilhousen et al. . |
| 5,438,565 | 8/1995 | Hemmady et al. . |
| 5,594,718 * | 1/1997 | Weaver, Jr. et al. .................. 370/331 |
| 6,011,960 * | 1/2000 | Yamada et al. ...................... 455/432 |
| 6,035,197 * | 3/2000 | Haberman et al. .................. 455/439 |

* cited by examiner

METHOD AND SYSTEM FOR PROVIDING A HANDOFF FROM A CDMA CELLULAR TELEPHONE SYSTEM

This application is a continuation of application Ser. No. 08/366,352 filed Dec. 29, 1994.

FIELD OF THE INVENTION

The present invention relates generally to wireless telecommunication systems. More particularly, the present invention relates to a method and system for providing handoff of a mobile telephone from a CDMA cellular telecommunication system to an analog cellular telecommunication system.

BACKGROUND INFORMATION

Wireless telecommunication systems provide information services traditionally provided by land-line or copper wire systems. Examples of wireless communications applications include Advanced Mobile Phone Service (AMPS) analog cellular service and AMPS-D digital cellular service in North America, and Group Speciale Mobile (GSM) cellular service in Europe.

Although the particular application may vary, the components of a wireless communication system are generally similar. For example, a wireless communication system usually includes a radio terminal or mobile station, a radio base station, a switch or network control device, often referred to as a mobile telephone switching office (MTSO), and a network to which the wireless communications system provides access, such as the Public Switched Telephone Network (PSTN).

The various wireless communication applications use different modulation techniques for transmitting information to more efficiently utilize the limited available frequency spectrum. For example, frequency division multiple access (FDMA), time division multiple access (TDMA) and code division multiple access (CDMA) modulation techniques are used to build high-capacity multiple access systems. Telecommunication systems designed to communicate with many mobile stations occupying a common radio spectrum are referred to as multiple access systems.

For example, in an FDMA analog cellular system, such as an AMPS analog cellular radio system, the available frequency spectrum is divided into a large number of radio channels, e.g., pairs of transmit and receive carrier frequencies, each of which corresponds to a message transmission channel. The bandwidth of each transmit and receive frequency channel is narrowband, generally 25–30 kHz. Thus, the FDMA system permits information to be transmitted in a bandwidth comparable to the bandwidth of the transmitted information, such as a voice signal. The cellular service area in the FDMA system is generally divided into a plurality of cells, each cell having a set of frequency channels selected so as to minimize co-channel interference between cells.

Frequency division is often combined with time division so that transmission circuits are trunked in both the frequency and time domain, e.g., a FD/TDMA system. In a digital FD/TDMA (commonly referred to as TDMA) cellular system, a narrowband frequency channel is reformatted as a digital transmission path which is divided into a number of time slots. The data signals from different calls are interleaved into assigned time slots and sent out with a correspondingly higher bit rate, the time slot assigned to each mobile station being periodically repeated. Although the TDMA bandwidth may be somewhat larger than the FDMA bandwidth, a bandwidth of approximately 30 kHz is generally used for AMPS-D digital TDMA cellular systems.

A very different approach to cellular multiple access modulation is CDMA. CDMA is a spread spectrum technique for transmitting information over a wireless communication system in which the bandwidth occupied by the transmitted signal is significantly greater than the bandwidth required by the baseband information signal (e.g., the voice signal). Thus, CDMA modulation spectrally spreads a narrowband information signal over a broad bandwidth by multiplex modulation, using a codeword to identify various signals sharing the same frequency channel. Recognition of the transmitted signal takes place by selecting the spectrally-coded signals using the appropriate codeword. In contrast to the narrowband channels of approximately 30 kHz used in FDMA and TDMA modulation techniques, a CDMA system generally employs a bandwidth of approximately 1.25 MHz or greater.

Regardless of the modulation technique used in a cellular telecommunication system, when a mobile station is in communication with its base station, for example to provide telephone service between a mobile station and a calling party, the cellular system must maintain uninterrupted service for the call despite movement of the mobile station through the cellular system. For example, in an analog cellular system, when the mobile station transitions from one cell to another cell, the mobile station must change frequencies because each cell supports a different set of frequencies. The process by which a cellular telecommunications system enables a mobile station to maintain an established connection when moving through cells of a cellular system is referred to as "handoff," and is generally controlled by the MTSO.

In a conventional analog cellular system, a handoff is triggered when the base station currently providing the link between the mobile station and the MTSO detects that the received signal strength from the mobile station has dropped below a predetermined level. The low signal strength from the mobile station usually indicates that the mobile station is approaching the boundary of the cell. When the received signal strength is below the predetermined value, the base station requests the MTSO determine whether another base station, e.g., a neighboring base station, is receiving a stronger signal from the mobile station than the current base station.

In response to the request from the current base station, the MTSO sends a message to the appropriate neighboring base stations to measure the received signal strength from the mobile station. The neighboring base stations, using a scanning receiver, monitor the frequency channel of the mobile station and measure the received signal strength, if possible. The measurements made by the neighboring stations are reported to the MTSO. If one of the neighboring base stations receives the mobile station signal above a predetermined level, then the MTSO directs a handoff of the mobile station from its current base station to a new base station in an adjoining cell. In particular, the MTSO informs the mobile station of a new frequency to be used with the new base station, while the MTSO also switches the call from the current base station to the new base station. If the handoff is unsuccessful, however, the call will be lost, e.g., terminated. This type of handoff is often referred to as a system-assisted handoff because the cellular system controls the detection of the need for, and the execution of, the handoff.

Another type of handoff is referred to as a mobile-assisted handoff (MAHO). For example, in a digital CDMA cellular system, each base station transmits a CDMA pilot signal on a common frequency, each pilot signal being differentiated by its phase offset compared to other pilot signals. A mobile station located in a digital CDMA cellular system regularly monitors the pilot signal strength received from the various pilot signals of neighboring base stations. The mobile station detects when the received signal strength of a pilot signal from its current base station has dropped below a predetermined level and the received signal strength of a neighboring base station pilot signal exceeds a predetermined level. The mobile station transmits these signal strength measurements to the MTSO via the base station with which the mobile station is in communication. The MTSO directs a handoff from one base station to another base station based on the signal strength measurements made by the mobile station.

A conventional narrowband analog cellular system, such as an AMPS FDMA cellular system, cannot support MAHO because in the analog system there is no pilot signal, the mobile station does not take measurements of the signals transmitted by the analog base station, and the handoff is controlled by the base stations and MTSO. Moreover, a 30 kHz analog cell base station cannot transmit a 1.25 MHz CDMA pilot signal.

Similar to the CDMA system MAHO, in a digital TDMA cellular system, each base station can transmit a unique 30 kHz beacon signal that is received and measured by the mobile station and reported to the MTSO. Based on the frequency of the beacon signal, the MTSO can identify the cell site associated with each beacon signal. When the received beacon signal strength drops below a predetermined value, then the mobile station reports the measurement to the MTSO, via a base station, and the MTSO can direct a handoff of the mobile station to another base station, either analog or digital TDMA, associated with a sufficiently strong beacon signal.

A TDMA to analog handoff is possible because both the TDMA system and the analog system are narrowband systems using 30 kHz frequency channels. Thus, a 30 kHz analog cell base station can support a TDMA MAHO handoff using a 30 kHz TDMA pilot signal. The TDMA MAHO has problems with false handoffs, however, because a mobile station can receive a 30 kHz signal that is not a beacon signal but rather is a communication signal from another mobile station. For example, a mobile station at a high elevation may transmit a 30 kHz signal on the same frequency as a particular beacon signal that is mistakenly detected as a beacon signal by another mobile station at a lower elevation, thus causing an unwarranted handoff and possibly a lost call.

In CDMA cellular telecommunication systems, a handoff is usually accomplished via a "soft handoff" from one base station to another base station. In a soft handoff, the mobile station is in communication with more than one base station simultaneously, and thus the mobile station performs a "make before break" transition from one base station to another base station. The soft handoff is possible because in CDMA cellular telecommunication systems, numerous mobile stations communicate with each base station on the same frequency channel, each mobile station having a unique spreading code for distinguishing the information signals broadcast by the numerous mobile stations. Thus, when a mobile station moves from one CDMA cell to another CDMA cell, the same frequency is used in each CDMA cell and the unique spreading code identifies the mobile station to the new base station.

In contrast to the soft handoff used in CDMA cellular systems, narrowband frequency modulation systems, such as FDMA and TDMA systems, employ a "hard handoff." The hard handoff, which is a "break before make" connection, is necessary in narrowband cellular systems because each mobile station is communicating with a base station on a particular narrowband frequency channel. The available frequency channels in adjoining cells differ, and thus when a mobile station moves from one cell to another cell, a new frequency channel must be used.

The advantage of employing a narrowband modulation scheme, such as FDMA, would be defeated if such a system utilized a soft handoff. For example, a narrowband FDMA cellular telecommunication system using a soft handoff would require that the mobile station simultaneously communicate with at least two base stations in adjoining cells on either the same or different frequencies. If the mobile station communicated on the same frequency to two adjoining base stations, co-channel interference would result from two base stations broadcasting on the same frequency to the mobile station, precisely the type of interference the narrowband system was designed to avoid. Alternatively, requiring the mobile station transmit its communication signal to at least two base stations in adjoining cells on two separate frequencies simultaneously is not possible because such simultaneous communication capability is not possessed by conventional mobile stations.

As spread spectrum modulation techniques, such as CDMA, are implemented within existing cellular telecommunications systems, compatibility issues arise regarding the integration of CDMA cell sites into existing analog cellular telecommunications systems. The commercial success of a cellular service provider is dependent in part on the provider's ability to provide seamless integration of new CDMA cell sites into existing analog systems, and in particular, the ability to have unnoticeable handoffs as a mobile station transitions from the CDMA portion of the system into the analog portion of the system.

One problem with integrating CDMA cells into existing analog cellular systems is the inability of conventional mobile stations to support CDMA and analog communications simultaneously. Conventional mobile stations provide a dual mode capability for generating and receiving spread spectrum and narrowband signals. The mobile stations, however, can operate in only one mode at a time. Therefore, while a mobile station is communicating on the cellular system via a CDMA channel, e.g., a 1.25 MHz channel, it is not possible for the mobile station to simultaneously communicate via a narrowband channel of the system, e.g., a 30 kHz channel.

Another problem is that a narrowband base station cannot receive a spread spectrum CDMA signal to measure the received signal strength necessary to perform a system-assisted handoff, as the CDMA signal is spread over a bandwidth that is larger than the narrowband channel which the narrowband base station is designed to receive. Also, a narrowband base station transmits a narrowband signal, e.g., a 30 kHz signal, and thus cannot provide a CDMA pilot signal to be received and measured by the mobile station to facilitate a MAHO to an analog base station. The handoff of a mobile station from a CDMA cell site to an analog cell site represents one of the more significant problems with integrating CDMA cell sites into existing cellular systems.

Current approaches to the problem of handoff of a mobile station from a CDMA portion of a cellular telecommunications network to an analog portion of the telecommunications network are inefficient and affect performance. For example, an additional analog cell can be placed in the CDMA cell for an internal handoff of the mobile station prior to handoff of the mobile station to the existing analog system.

Under this approach, when a handoff of a mobile station from the CDMA portion of the system to the analog portion is necessary, a handoff is first performed from the CDMA base station to the additional analog base station in the same cell, i.e., the CDMA cell is actually a digital/analog cell, capable of supporting both types of modulation. Assuming, however, that the mobile station is transitioning beyond the boundary of the digital/analog cell to an analog cell, another handoff is required to an analog base station of the existing analog system. Thus, two hard handoffs are required for the transition of a mobile station across only one boundary, whereas only one handoff would be desirable.

In addition to requiring an unnecessary handoff within the CDMA cell, the above approach presents other problems. For example, the handoff from the CDMA base station to the analog base station in the same cell is a "blind handoff." As described above, the bandwidths of spread spectrum and narrowband frequency channels are incompatible, as are the types of modulation techniques. Thus, the CDMA to analog handoff in the same cell site is directed without the benefit of knowing that the target analog base station is indeed the best target base station, or with what strength the communication signals from the mobile station will actually be received by the target analog base station. As a result of the lack of information on the suitability of the handoff, it is possible that the handoff might not be properly executed, resulting in a lost call, e.g., termination of the call.

Another problem with this approach to CDMA to analog handoffs is the necessity of reducing the available coverage area of the CDMA cell. A benefit of a CDMA cell, as well as digital cells generally, is that the cellular service area provided by the CDMA cell, often referred to as its "footprint," is larger than the footprint of conventional analog cells. However, in order to perform a CDMA to analog handoff within the CDMA cell that has a significant chance of success, the footprint of the CDMA cell must be reduced so that there is sufficiently strong analog coverage when the CDMA to analog handoff in the same cell site actually occurs.

A further problem with this approach to CDMA to analog handoff is unwarranted handoffs to the analog portion of the cellular telecommunications system. For example, using the MAHO scheme that is implemented in a CDMA cellular system, a handoff is directed when the received signal strength of the pilot signal from a base station with which the mobile station is in communication drops below a predetermined level. Thus, a mobile station may enter an area within the coverage area of a CDMA cell but for some reason, the CDMA pilot signals received by the mobile station are attenuated. For example, the mobile station could enter an underground parking garage. If the pilot signals are below the predetermined value, then the MTSO will direct a handoff to the analog portion of the cellular system. The handoff, however, generally will not solve the problem of the mobile station's poor reception in the underground parking garage, and thus prematurely takes the mobile station off the CDMA portion of the cellular system. In conventional cellular systems having analog and CDMA portions, there is generally no provision for handoff from an analog portion of the system back to the CDMA portion of the system. Therefore, this approach to CDMA to analog handoff allows unwarranted and unnecessary handoffs to the analog portion of a cellular telecommunications system when the actual preference of the cellular system is to keep the mobile station on the digital portion of the system as long as possible.

Another approach to CDMA to analog handoff is a direct handoff from the CDMA cell site to the desired analog cell site, thus avoiding an interim analog handoff. This approach, however, has some of the same problems as the above CDMA to analog handoff method. In particular, the direct handoff approach is a blind handoff to the analog cell site due to the lack of information available to the mobile station about the analog base station while the mobile station is in communication with the CDMA cell site.

Therefore, a need exists for a method of directing a handoff of a mobile station from a spread spectrum portion of a cellular system to an analog portion of the cellular system which minimizes additional equipment costs, avoids unnecessary handoffs to the analog portion of the system, and ensures continuation of an existing call in the analog portion of the system upon completion of the handoff.

SUMMARY OF THE INVENTION

The method according to the present invention provides a mobile assisted handoff of a mobile station transitioning from a CDMA portion of a cellular telecommunications network to an analog portion of the network utilizing a CDMA pilot signal transmitter located at each analog cell in the analog portion of the network.

According to the present invention, the mobile station constantly monitors the CDMA pilot signal transmitted from each CDMA cell. The mobile station also monitors the CDMA pilot signal transmitted from each analog cell. The mobile station measures the signal strength of each received CDMA pilot signal and transmits the signal strength to the MTSO via the base station(s) with which the mobile station is currently in communication. The MTSO includes the capability of distinguishing which base station, e.g., a CDMA base station or an analog base station, with which each pilot signal is associated based on the phase offset of the pilot signal relative to a time standard of the cellular system.

When the mobile station receives a pilot signal from an analog cell whose signal strength is above a first predetermined threshold level, and the received signal strengths of all pilot signals of the CDMA base station with which the mobile station is currently in communication are below a second predetermined threshold level, the MTSO directs a CDMA to analog handoff message to the mobile station. As a result, the mobile station is handed off to the appropriate analog base station in the analog portion of the system.

The method according to the present invention minimizes the additional equipment expenses needed for implementing an efficient and reliable CDMA to analog handoff by placing a conventional CDMA pilot signal transmitter at each analog cell site and providing the MTSO with the capability of recognizing and processing measurements made by a mobile station of CDMA pilot signals broadcast from analog cell sites. In addition, the method according to the present invention prevents unwarranted handoffs by directing a CDMA to analog handoff only when the CDMA pilot signal from an analog cell site is the best candidate for handling the mobile station compared to other CDMA cell pilot signals.

In further embodiments of the present invention, the method provides for handoff of a mobile station from a CDMA cellular telecommunications system to a personal communications system (PCS) or to a digital TDMA cellular telecommunications system.

DETAILED DESCRIPTION OF THE INVENTION

Figure 1:
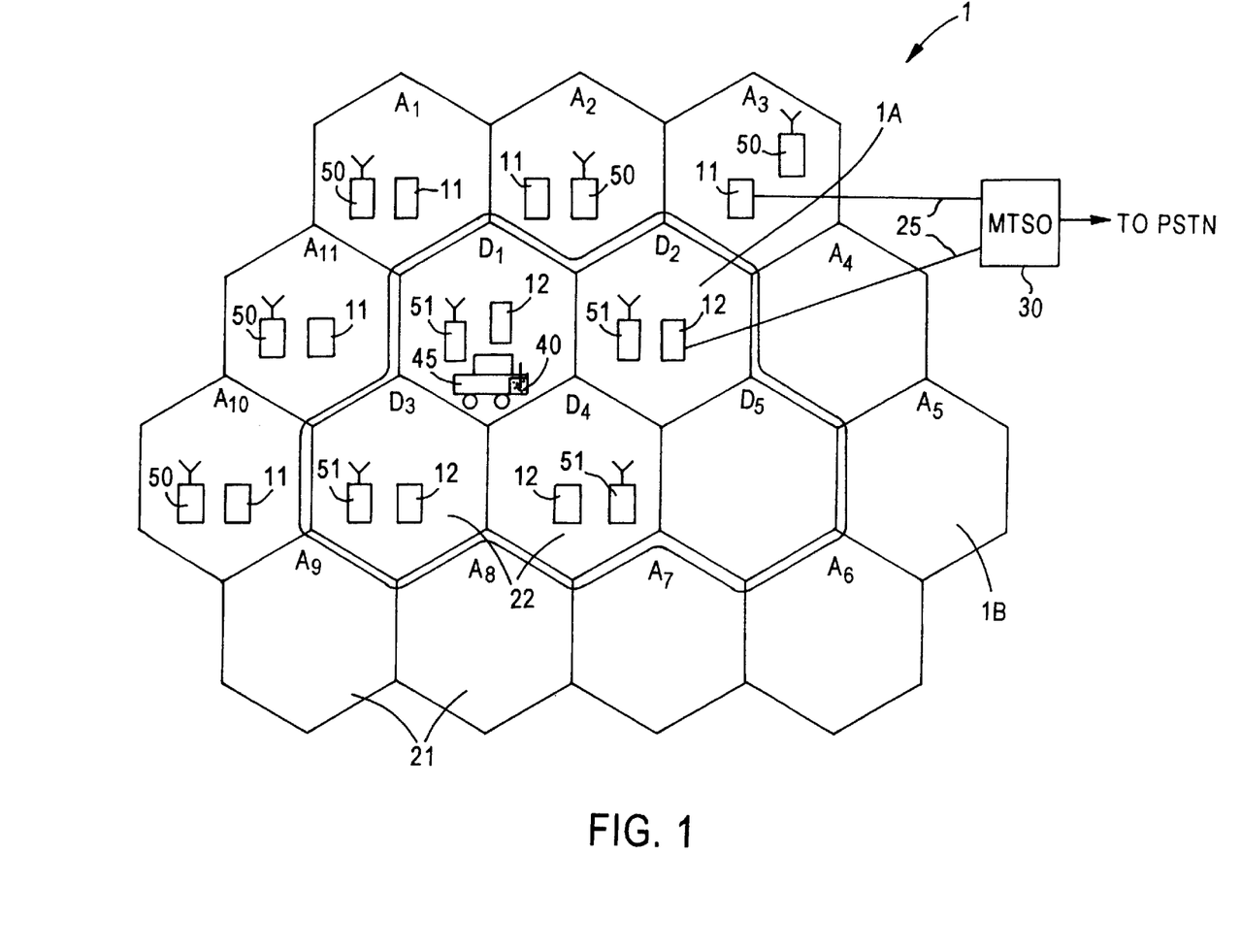
FIG. 1 shows a mobile station transitioning through a cellular telecommunication system according to the present invention including a CDMA portion of the cellular telecommunication system and an analog portion of the cellular telecommunication system.

FIG. 1 shows a cellular telecommunication system 1 according to the present invention having a digital portion 1A and an analog portion 1B. The digital portion 1A includes a plurality of (for example, five) digital cells 22, labeled $D_1$ to $D_5$. A digital cell 22 supports cellular telecommunication using digitally modulated signals, such as CDMA signals. The digital cells 22 also can be digital/analog cells, which have the capability of supporting both digital cellular communications and analog cellular communications. The analog portion 1B includes a plurality of (for example, eleven) analog cells 21, labeled $A_1$ to $A_{11}$. An analog cell 21 supports cellular telecommunication using analog signals, such as FDMA modulated signals. Each digital cell 22 includes a base station 12 and a digital pilot signal transmitter 51. Each analog cell 21 includes a base station 11 and a digital pilot signal transmitter 50 according to the present invention.

Figure 2:
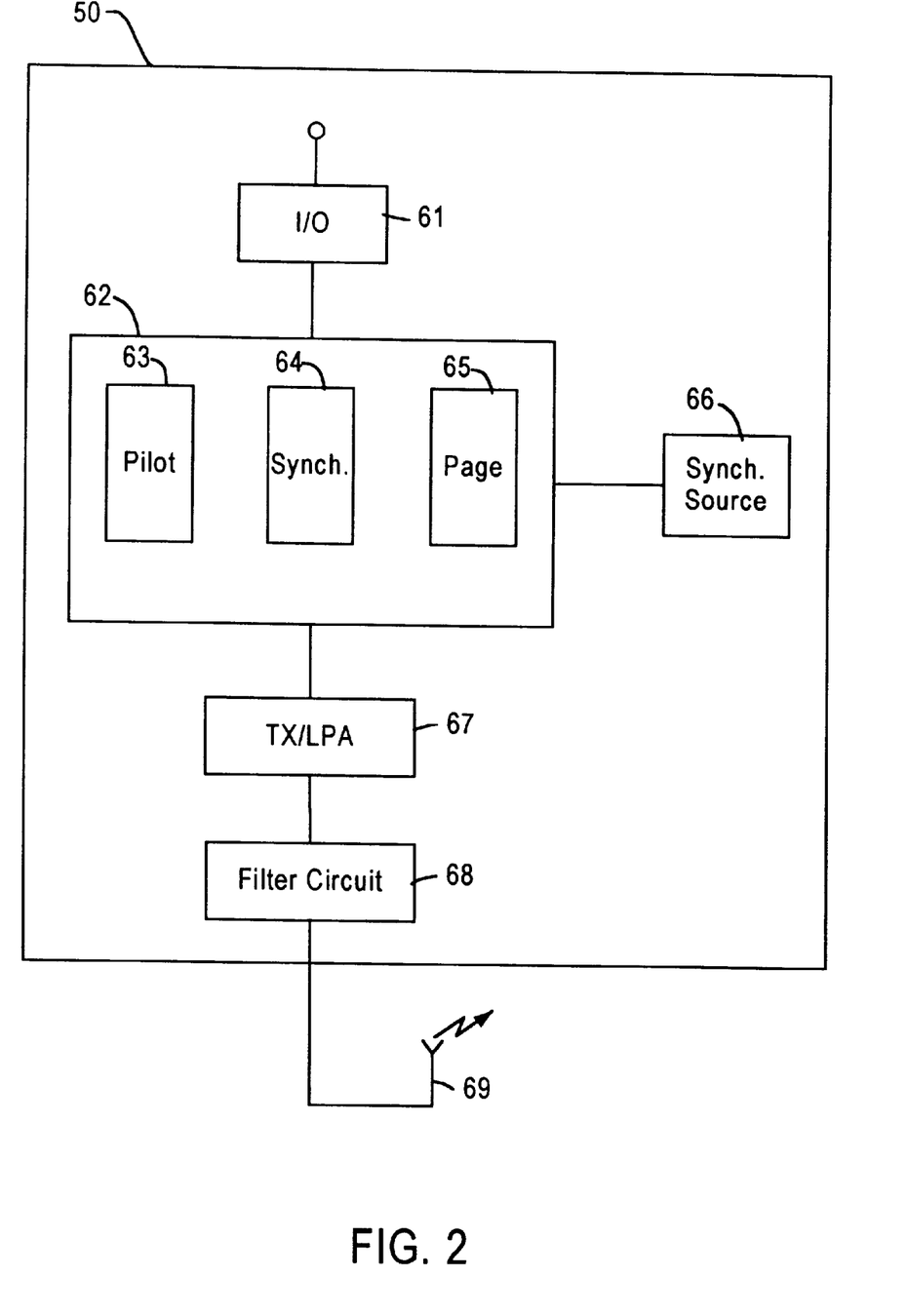
FIG. 2 shows a block diagram of a pilot signal transmitter according to the present invention.

FIG. 2 shows an exemplary digital pilot signal transmitter 50 according to the present invention that can be placed in an analog cell 21. The pilot signal transmitter 50 includes, for example, an input/output (I/O) device 61 which allows connection via, for example, a dedicated phone line or wireless connection, to the MTSO 30 for parameter modification and for monitoring operation of the pilot signal transmitter 50. Coupled to the I/O device 61 is a line card shelf 62. Contained in the line card shelf 62 are a pilot signal line card 63, a synchronization line card 64 and a paging signal line card 65. The pilot signal line card 63 generates a pilot signal compatible with the modulation architecture used in the digital portion 1B of the cellular system 1, e.g., CDMA modulation. The synchronization line card 64 provides for synchronization of the pilot signal generated by the pilot signal line card 63. The paging signal line card 65 provides for the generation of paging signals. The line cards 63, 64 and 65 are powered by a power supply included in line card shelf 62.

A synchronization source 66 is coupled to the synchronization line card 64 for providing accurate timing for operation of the pilot signal transmitter 50. The synchronization source 66 can be, for example, a Global Positioning System (GPS) receiver, a LORAN receiver or a rubidium oscillator. The pilot signal transmitter 50 also includes a transmitter/low power amplifier stage 67 for taking the pilot signal generated by the pilot signal line card 63 from its baseband frequency to a radio frequency at the desired power level. A filter circuit 68 eliminates any unnecessary noise signals and limits out-of-band emissions. A transmit antenna 69 is coupled to the filter circuit 68 for broadcasting the pilot signal generated by the pilot signal transmitter 50.

The pilot signal transmitter 51 can have, for example, a similar construction to the pilot signal transmitter 50. The CDMA pilot signals generated by the pilot signal transmitters 50, 51 are similar except for the phase offset used to identify the location of each pilot signal transmitter.

As shown in FIG. 1, the base stations 11, 12 are coupled to a Mobile Telephone Switching Office (MTSO) 30 via a dedicated telephone line, cable, optical fiber or microwave link 25. The MTSO 30 typically provides system control to the base stations 11, 12. The MTSO 30 also controls the routing of telephone calls from a public switched telephone network (PSTN) to the appropriate base stations 11, 12 for transmission to a mobile station 40.

A mobile station 40 is located in a vehicle 45 that is currently in a digital cell 22 and moving towards an analog cell 21. Thus, the mobile station 40 is transitioning from the digital portion 1A of the cellular system to the analog portion 1B of the system. The mobile station 40 constantly monitors the pilot signals transmitted by each pilot signal transmitter 50, 51, both during idle time, i.e. no telephone call being processed, and busy times.

While the mobile station 40 is located in the digital portion 1A of the cellular system 1, the mobile station 40 receives a digitally modulated telephone call routed from the MTSO 40 through a digital base station 12 to the mobile station 40. The signal transmitted to the mobile station 40 can be, for example, a CDMA signal. As the mobile station 40 moves across the boundary from its current digital cell 22 to a new candidate digital cell 22, for example from cell $D_2$ to $D_1$, the mobile station 40 moves closer to the candidate digital cell $D_1$ base station 12. Accordingly, a handoff is necessary from the current base station in cell $D_2$ to the candidate base station in cell $D_1$ to maintain the established connection for the telephone call.

The handoff of the mobile station 40 from its current digital cell $D_2$ to the candidate digital cell $D_1$ involves a mobile-assisted handoff (MAHO) wherein the mobile station 40 receives the pilot signal transmitted by each pilot signal transmitter 51 located in each digital cell 22 which is sufficiently strong to reach the mobile station 40. The pilot signal transmitter 51 can be incorporated into the base station 12 equipment or it can be a stand-alone device. The mobile station 40 measures the phase offset and power level (signal strength) of each received pilot signal and transmits the measurements to the MTSO 30, via its current base station 12, so that the MTSO 30 can direct a handoff. The handoff is typically a soft handoff wherein the mobile station 40 communicates simultaneously with two or more base stations 12. Thus, the mobile station 40 transmits only one signal which may be received by multiple base stations 12, but signals to the mobile station 40 can be transmitted from multiple base stations 12. Based on the signal strength measurements made by the mobile station 40 and transmitted to the MTSO 30, the mobile station 40 establishes and/or terminates communications with base stations 12 upon direction from the MTSO 30, thus completing the soft-handoff.

As the mobile station 40 continues to move across the boundary from a digital cell 22 to an analog cell 21, for example, from cell $D_1$ to cell $A_{11}$, a handoff is necessary from the CDMA digital portion 1A of the cellular system to the analog portion 1B of the system in order to maintain the established connection for the telephone call involving the mobile station 40. Unlike the transition of the mobile station 40 from one digital cell 22 to another digital cell 22, when the mobile station 40 is crossing the boundary from a CDMA digital cell 22 to an analog cell 21, a soft handoff is not possible because the mobile station 40 cannot simultaneously communicate via a CDMA channel with a base station 12 and also via an analog channel with a base station 11. Thus, the MTSO 30 must provide a handoff message to the mobile station 40 for handoff to the analog base station 11.

The message format for directing a handoff of a mobile station between CDMA cells and also from a CDMA cell to an analog cell is provided by the industry standard specification IS-95, for example. To facilitate CDMA handoffs, IS-95 classifies the pilot signal offsets of the CDMA pilot signals associated with each base station 12 into one of three sets: the ACTIVE SET; the CANDIDATE SET; and the REMAINING SET.

The ACTIVE SET identifies the pilot signal offsets of the pilot signals associated with base stations 12 through which the mobile station 40 is to communicate. The CANDIDATE SET identifies the pilot signal offsets of the pilot signals associated with the base station 12 with which communication is likely or for which pilot signals have been received at the mobile station 40 with sufficient signal strength to be placed in the ACTIVE SET, but have not yet been placed in the ACTIVE SET. The REMAINING SET identifies the pilot signal offsets of the pilot signals associated with the remaining base station 12 in the cellular system 1, excluding those pilot signal offsets currently in the ACTIVE and CANDIDATE sets. By providing the mobile station 40 with the pilot signal offset information, the mobile station 40 knows during which time period it should be receiving a pilot signal.

The MTSO 30 provides the mobile station 40 with an initial ACTIVE SET list of at least one pilot signal offset of a pilot signal from a pilot signal transmitter 51 associated with a base station 12 with which the mobile station is to communicate. The MTSO 30 also provides the mobile station 40 with a CANDIDATE SET list of pilot signal offsets corresponding to base stations 12 with which communication is likely. For example, base stations which are in a geographic area near the mobile station 40 are placed in the CANDIDATE SET.

According to the present invention, a CDMA pilot signal transmitter 50 is placed in each analog cell 21, thus associating a CDMA pilot signal with each analog base station 11. The MTSO 30 can identify the phase offset of the pilot signals broadcast from the analog cells 21 received by the mobile station 40 and transmitted to the MTSO 30, and thus associate the pilot signal with the analog base station 11. Therefore, the phase offsets of the pilot signals transmitted from the analog cells 21 can be incorporated into the IS-95 classifications. Pilot signal offsets associated with the pilot signals broadcast by pilot signal transmitters 50 located in the analog cells 21, however, cannot be placed in the ACTIVE SET until the mobile station 40 is actually handed off to the analog base station 11 and communications with any base stations 12 have been terminated because a mobile station 40 cannot simultaneously communicate with digital base station 12 and an analog base station 11.

The cellular system 1 according to the present invention thus includes a CDMA pilot signal transmitter 50 in each analog cell 21 for facilitating handoff of mobile station 40 from a CDMA cell 22 directly to an analog cell 21. Accordingly, the handoff method according to the present invention minimizes the additional equipment necessary for providing CDMA to analog handoffs and the possibility of lost calls.

Figure 3:
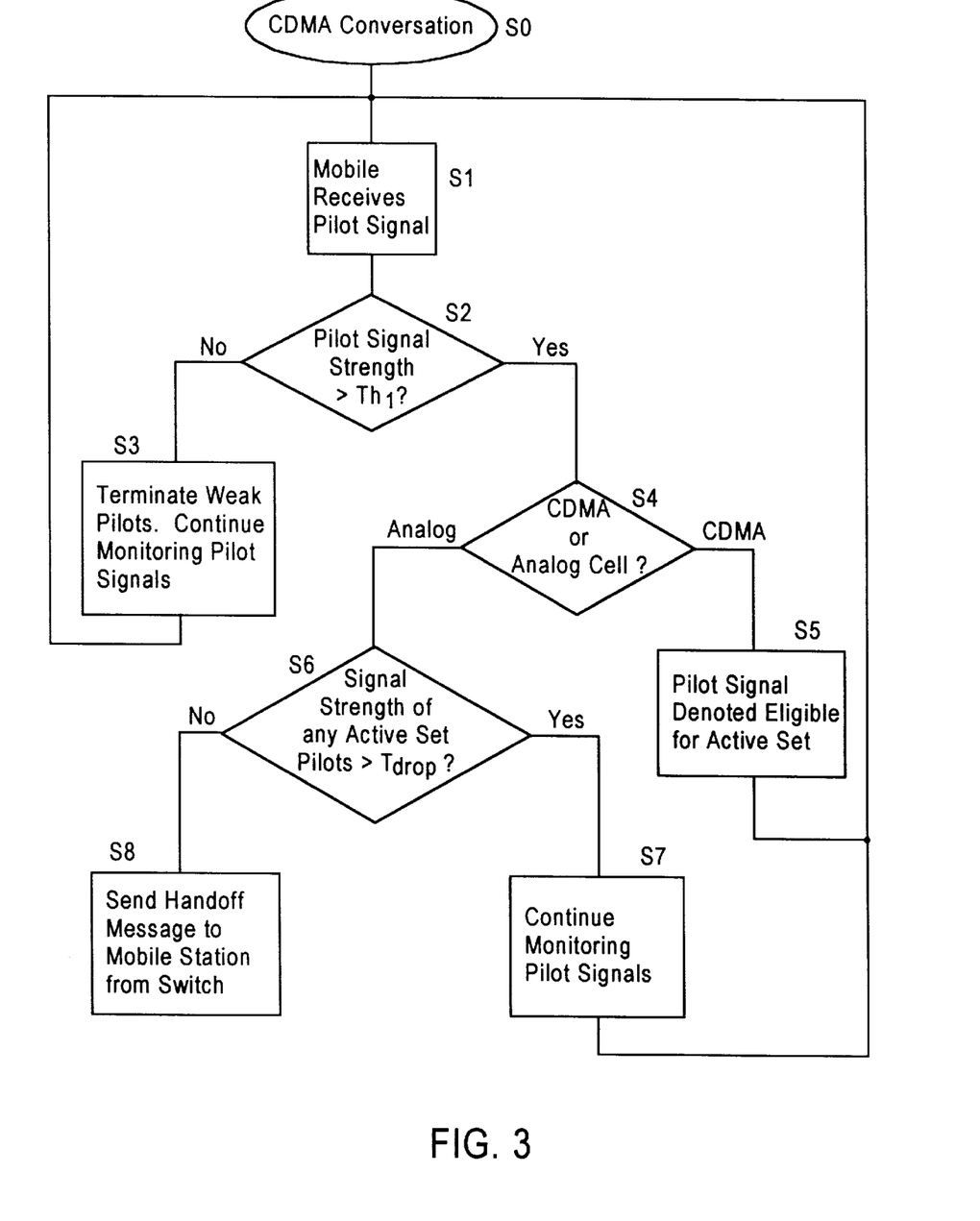
FIG. 3 is an illustrative flowchart of the CDMA to analog handoff method according to the present invention.

FIG. 3 is an illustrative flowchart of the process for handoff of the mobile station 40 as the mobile station 40 crosses the boundary from the digital cell 22 to the analog cell 21 according to the present invention.

In step S0, the mobile station 40 is processing a CDMA modulated telephone call between the mobile station 40 and a calling party via the digital portion 1B of the cellular system 1. In step S1, the mobile station 40 receives a pilot signal transmitted from a base station 11, 12 in the cellular system 1. The mobile station 40 measures the phase offset and the power level of the pilot signal and transmits the offset and signal strength measurements to the MTSO 30 via the base stations 12 with which the mobile station is in communication.

The mobile station 40 continuously scans for pilot signals and can perform, for example, continuous measurements of the pilot signals transmitted by pilot signal transmitters 50, 51. In step S2, the MTSO 30 determines whether the signal strength of the pilot signal measured by the mobile station 40 exceeds a first predetermined threshold value, $Threshold_1$, and therefore is eligible to be added to the ACTIVE SET or CANDIDATE SET. If the signal strength of the pilot signal measured by the mobile station 40 is less than $Threshold_1$, the pilot signal offset is not eligible to be added to the ACTIVE SET.

If the signal strength of the pilot signal from a base station 12 with which the mobile station 40 is in communication drops below a second predetermined threshold value, $T_{drop}$, then the pilot signal is dropped from the ACTIVE SET. In step S3, the MTSO 30 can direct termination of communications between the mobile station 40 and the base station 12 corresponding to the pilot signal having a signal strength measurement below $T_{drop}$. The mobile station 40 then returns to step S1 and continues measuring the offset and signal strength of received pilot signals and forwarding the measurements to the MTSO 30 via the base stations 12.

If the signal strength of a pilot signal received by the mobile station 40 exceeds $Threshold_1$, in step S4 the MTSO 30 determines whether the pilot signal is associated with a digital cell 22 or an analog cell 21. Based on the phase offset measurement made by the mobile station 40, the MTSO 30 can identify the pilot signal and its associated base station 11, 12, (i.e., a CDMA base station 12 or an analog base station 11). If the pilot signal is associated with a CDMA digital cell 22, in step S5 the pilot signal offset is denoted by the MTSO 30 as eligible for inclusion in the ACTIVE SET or CANDIDATE SET stored in the mobile station 40. Depending on the availability of the base station 12 of the CDMA cell 22, the MTSO 30 directs the mobile station 40 to establish communication with the new base station 12 via, for example, a soft handoff. The mobile station 40 then continues monitoring for pilot signals in step S1.

If the pilot signal has a signal strength which exceeds $Threshold_1$ and is associated with an analog cell 21, the pilot signal offset can be included in the CANDIDATE SET. In step S6 the MTSO 30 determines whether the signal strength of any of the pilot signals in the ACTIVE SET exceed the second predetermined threshold value, $T_{drop}$. If any of the pilot signals in the ACTIVE SET exceed $T_{drop}$, then the mobile station 40 remains on the digital portion 1B of the cellular system and in step S7 the mobile station 40 returns to step S1 to continue monitoring the pilot signals.

If, however, no pilot signals in the ACTIVE SET exceed $T_{drop}$, in step S8 the MTSO sends a handoff message to the mobile station 40, via at least one of the base stations 12, directing the mobile station 40 to terminate communications with base stations 12 and to tune to an analog frequency of the analog cell 21. The MTSO 30 also directs the analog cell 21 base station 11 to tune a receiver to the same frequency provided to the mobile station 40 and the MTSO 30 reroutes the telephone call through the analog base station 11. Once the handoff of the mobile station 40 from the digital base station 12 to the analog base station 11 is completed, call processing is handled in a manner similar to call processing in conventional analog cellular systems.

Although the present invention has been described with respect to handoff of a mobile station from a CDMA cell to an analog cell, the principles of the present invention also can be used for handoff of a mobile station from a CDMA cell to another wireless communication system or portion thereof having a different frequency band or modulation technique than the CDMA cell with which the mobile station is currently in communication. For example, the method according to the present invention can be used for handoff of a mobile station from a CDMA cellular telecommunications system to a personal communications system (PCS) or to a digital TDMA cellular telecommunications system.

What is claimed is:

1. A method of conducting a handoff of a mobile station from a first cellular communication system to a second cellular communication system, the first cellular communication system utilizing a code division multiple access (CDMA) communication in accord with a first technique, the second cellular communication system utilizing an alternative communication technique, the method comprising the steps of:

conducting a communication session for the mobile station through one of a plurality of base stations of the first cellular communication system in accord with the first communication technique;

receiving in the mobile station, a CDMA pilot signal compatible with the first communication technique from a CDMA transmitter associated with one of a plurality of base stations of the second cellular communication system; and directing handoff of the mobile station from the base station of the first cellular communication system to a base station of the second cellular communication system utilizing the alternative communication technique, as a function of the CDMA pilot signal received by the mobile station.

2. A method as in claim 1, further comprising:

breaking the communication for the mobile station through the one base station of the first cellular communication system; and subsequently making communication for the mobile station through the base station of the second cellular communication system utilizing the alternative communication technique.

3. A method as in claim 2, wherein the alternative communication technique utilizes a different frequency band than the CDMA communication in accord with a first technique.

4. A method as in claim 2, wherein the alternative communication technique utilizes a different modulation than the CDMA communication in accord with a first technique.

5. A method as in claim 2, wherein the alternative communication technique utilizes an analog communication technique.

6. A method as in claim 1, wherein the directing step comprises directing a hard handoff of the mobile station from the first cellular communication system to the second cellular communication system.

7. A method as in claim 1, wherein:

the step of conducting a communication session comprises receiving in the mobile station, a CDMA pilot signal compatible with the first communication technique from the one base station of the first cellular communication system; and the step of directing handoff comprises recognizing a need for the handoff as a function of levels of the CDMA pilot signal from the one base station of the first cellular communication system and the CDMA pilot signal from the transmitter associated with the one base station of the second cellular communication system.

8. A cellular telecommunications system providing cellular service to a mobile station, comprising:

a first system comprising a plurality of first base stations providing the cellular service in accord with a code division multiple access (CDMA) communication technique;

a first CDMA pilot signal transmitter in the first system and associated with at least one of the first base stations, for transmitting a unique first pilot signal compatible with the CDMA communication technique;

a second system comprising a plurality of second base stations providing the cellular service in accord with an alternate communication technique;

a second CDMA pilot signal transmitter in the second system and associated with at least one of the second base stations, for transmitting a unique second pilot signal compatible with the CDMA communication technique; and a communication controller, coupled to a plurality of the base stations, for directing a handoff of the mobile station from the first system to the second system as a function of receipt of the unique first pilot signal and the unique second pilot signal.

9. A cellular telecommunications system as in claim 8, wherein the communication controller comprises a mobile telephone switching office (MTSO) in communication with at least the first base stations.

10. A cellular telecommunications system as in claim 8, wherein the second base stations provide the cellular service on a different frequency band than used for the CDMA communication technique of the first system.

11. A cellular telecommunications system as in claim 8, wherein the second base stations provide the cellular service in accord with an analog communication technique.

12. A cellular telecommunications system as in claim 8, wherein the second base stations provide the cellular service in accord with a time division multiple access (TDMA) communication technique.

13. A method of communicating with a remote unit using a cellular communication system comprised of a first plurality of base stations for communication using a first technique and a second plurality of base stations for communication using a second technique different from the first technique, the first technique comprising code division multiple access (CDMA) digital communication on a predetermined frequency band, said method comprising the steps of:

transmitting according to said first technique an identification signal from each base station in said first plurality of base stations;

transmitting according to said first modulation technique an identification signal from at least each base station in said second plurality of base stations which is adjacent one of the first base stations; and determining from identification signals received in the remote unit whether to initiate a change from communication in the first base stations to communication in the second base stations.

14. A method as in claim 13, wherein the determining step comprises:

receiving identification signals from a plurality of base stations in the remote unit;

sending data regarding received identification signals from the remote unit to a system controller separate from the base stations;

analyzing the received identification signals in the system controller; and if the received identification signals satisfy predetermined conditions, initiating the change from communication in first base stations to communication in the second base stations.

15. A method as in claim 13, wherein the determining step comprises:

receiving the identification signal from one of the first plurality of base stations in the remote unit and comparing to a first threshold;

receiving the identification signal from one of the second plurality of base stations in the remote unit and comparing to a second threshold; and determining to initiate the change from communication in the first base stations to communication in the second base stations if the identification signal from one of the first base stations does not exceed the first threshold and the identification signal from one of the second base stations is above the second threshold.

16. A cellular communication system comprised of a plurality of base stations and a plurality of mobile units wherein the mobile units may handoff operation between base stations during an active call, said system comprising:

a first group of said base stations for communicating call signals with active mobile units via a first technique comprising using a code sequence to modulate and transmit active call signals and transmitting a first base station reference signal;

a second group of said plurality of base stations for communicating active calls with the mobile units using an alternative technique and for transmitting an alternative base station reference signal analogous to the base station reference signals transmitted by the first group of base stations;

an identified mobile unit for monitoring the base station reference signals and transmitting indications thereof through a first base station of the first group, to assist in handoff from the first base station of the first group to a subsequent base station; and a system controller for controlling at least the first group of base stations and for receiving the indications of monitored reference signals from the identified mobile unit and controlling the handoff of the identified mobile unit in response thereto, wherein the subsequent base station may be a member of the first group of base stations or of the second group of base stations.

17. A cellular communication system as in claim 16, wherein the first group of base stations comprise code division multiple access (CDMA) cellular base stations.

18. A cellular communication system as in claim 17, wherein the second group of base stations comprise analog cellular base stations.

19. A cellular communication system as in claim 17, wherein the second group of base stations comprise time division multiple access (TDMA) base stations.

20. A cellular communication system as in claim 17, wherein the second group of base stations comprise personal communication service (PCS) base stations.

21. A cellular communication system as in claim 17, wherein:

the CDMA cellular base stations of the first group of base stations operate on a first predetermined frequency band; and the second group of base stations operate on a second predetermined frequency band different from first predetermined frequency band.

22. A method of operation of a mobile unit in a cellular communication system, comprising:

communicating with at least one of a plurality of base stations of a first system using code division multiple access (CDMA) communication;

monitoring one or more reference signals broadcast by the base stations of the first system and sending indications thereof to a system controller;

monitoring one or more reference signals broadcast by a plurality of base stations of a second system and sending indications thereof to the system controller, the reference signals broadcast by the base stations of the second system being analogous to the reference signals broadcast by the base stations of the first system, the base stations of the second system providing communication in a manner different from communication provided by the base stations of the first system;

receiving an instruction from the controller and in response thereto conducting a handoff from the at least one base station of the first system to a base station of the second system; and communicating via the second system.

23. A method as in claim 22, wherein the step of communicating via the second system comprises communicating with a base station of the second system over a predetermined frequency band used by the second system, which is different from a predetermined frequency band used by the first system.

24. A method as in claim 22, wherein the step of communicating via the second system comprises communicating using a time division multiple access (TDMA) technique.

25. A method as in claim 22, wherein the step of communicating via the second system comprises communicating analog format signals.

26. A method as in claim 22, wherein the conducting of a handoff comprises conducting a hard handoff.

27. A method as in claim 22, wherein the conducting of a handoff comprises:

breaking the CDMA communication with at least one base station of the first system; and subsequently initiating communication through a base station of the second system.

* * * * *